United States Patent
N et al.

(10) Patent No.: US 11,703,239 B2
(45) Date of Patent: Jul. 18, 2023

(54) METHOD AND A SYSTEM FOR MONITORING ITEMS

(71) Applicant: Carrier Corporation, Palm Beach Gardens, FL (US)

(72) Inventors: Ananthakrishnan N, Telangana (IN); Suresh Manda, Telangana (IN); Vamsikrishna Basetty, Telangana (IN); Ramesh Babu, Telangana (IN); Sharath Kumar B G, Telangana (IN); Anusha Koneru, Telangana (IN); Sumantra Ghosh, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 274 days.

(21) Appl. No.: 17/116,136

(22) Filed: Dec. 9, 2020

(65) Prior Publication Data

US 2021/0231326 A1 Jul. 29, 2021

(30) Foreign Application Priority Data

Jan. 29, 2020 (IN) .............................. 202011003980

(51) Int. Cl.
*F24F 11/30* (2018.01)
*F24F 110/20* (2018.01)
(Continued)

(52) U.S. Cl.
CPC .......... *F24F 11/30* (2018.01); *F24F 2110/10* (2018.01); *F24F 2110/20* (2018.01); *F24F 2110/70* (2018.01)

(58) Field of Classification Search
CPC .... F24F 11/30; F24F 2110/20; F24F 2110/70; F24F 2110/10
See application file for complete search history.

(56) References Cited

U.S. PATENT DOCUMENTS 6,471,136 B1 * 10/2002 Chatterjee ............. F25D 17/042
237/2 B
8,286,437 B2 10/2012 Sanders et al.
(Continued)

FOREIGN PATENT DOCUMENTS

CN 106524629 A 3/2017
CN 206176862 U 5/2017
(Continued)

OTHER PUBLICATIONS

European Search Report for Application No. 20213578.6; dated Jun. 10, 2021; 6 Pages.

*Primary Examiner* — Chico A Foxx
(74) *Attorney, Agent, or Firm* — Cantor Colburn LLP

(57) ABSTRACT

Aspects of the invention are directed towards a system and a method for monitoring one or more items. One or more embodiments of the invention describe the method comprising steps of receiving, from a device, information of sensed parameter(s) of one or more items. The one or more items placed inside a container. The method further describes steps of determining, by a first server, an anomaly associated with the one or more items based on the information of the sensed parameter(s). The method also describes steps of communicating the determined anomaly to a second server, wherein the second server determines an action for the anomaly and communicates the action to the container for rectifying the anomaly.

18 Claims, 5 Drawing Sheets

(51) Int. Cl.
*F24F 110/70* (2018.01)
*F24F 110/10* (2018.01)

(56) References Cited

U.S. PATENT DOCUMENTS

| | | | |
|---|---|---|---|
| 9,060,337 B2 | 6/2015 | Sanders et al. | |
| 10,228,188 B2 | 3/2019 | Thogersen et al. | |
| 10,845,079 B1* | 11/2020 | Picardi | F24F 11/58 |
| 2006/0220842 A1* | 10/2006 | Breed | G06Q 10/06 |
| | | | 340/568.1 |
| 2006/0264221 A1 | 11/2006 | Koike et al. | |
| 2008/0270076 A1* | 10/2008 | Breed | G06F 3/0233 |
| | | | 702/185 |
| 2008/0272923 A1* | 11/2008 | Breed | B60R 21/01542 |
| | | | 340/632 |
| 2010/0283626 A1* | 11/2010 | Breed | G01S 7/417 |
| | | | 340/8.1 |
| 2012/0198866 A1 | 8/2012 | Zeidner | |
| 2013/0340444 A1* | 12/2013 | Bryant | F25D 29/001 |
| | | | 62/62 |
| 2014/0180953 A1* | 6/2014 | Westcott | G06Q 10/0832 |
| | | | 705/332 |
| 2016/0239802 A1* | 8/2016 | Burch, V | B65D 90/48 |
| 2017/0368910 A1 | 12/2017 | Weber et al. | |
| 2018/0099062 A1* | 4/2018 | Campalans | B65D 81/2076 |
| 2018/0194195 A1* | 7/2018 | Bryant | F25D 29/001 |
| 2019/0049172 A1 | 2/2019 | Beasley et al. | |
| 2019/0105964 A1 | 4/2019 | Yasar et al. | |
| 2019/0250653 A1* | 8/2019 | Conlon | G08B 21/182 |

FOREIGN PATENT DOCUMENTS

| | | |
|---|---|---|
| CN | 106864343 A | 6/2017 |
| CN | 107953821 A | 4/2018 |
| CN | 208484604 U | 2/2019 |
| DE | 102018205432 A1 * | 10/2019 |
| FR | 3066757 A1 | 11/2018 |
| WO | 2017172701 A1 | 10/2017 |

* cited by examiner

METHOD AND A SYSTEM FOR MONITORING ITEMS

CROSS-REFERENCE TO RELATED APPLICATIONS

This application claims priority to Indian Patent Application No. 202011003980, filed Jan. 29, 2020, the contents of which are incorporated by reference herein in their entirety.

TECHNICAL FIELD OF INVENTION

The present invention generally relates to monitoring of items. More particularly, the invention relates to a system and a method for monitoring of items placed in a container.

BACKGROUND

While transporting, one or more items are packed in a number of boxes placed inside a container. Further, some items may be required to be maintained in a desired environment so that the items inside the box remain fresh and fit for consumption by an end consumer. Such desired environment may involve maintaining atmospheric parameters (like temperature, humidity or air pressure) in the box in order to keep the items fresh or prevent them from becoming stale. In the absence of devices configured to maintain the desired environment in the box, the item may become stale or non-consumable for the end consumer and the consumption of such items by the end consumer may affect the health of the end consumer.

Current solutions present in the market provide monitoring of atmospheric parameters inside a container where the boxes having the items are placed. However, monitoring of atmospheric parameters inside a container provides information only of the atmospheric parameters outside a cargo box (i.e. inside the container) and does not provide accurate information of atmospheric parameters inside a cargo box where items are kept. Since atmospheric parameters maintained inside a cargo box will be different from atmospheric parameters maintained outside a cargo box, it is important to get accurate information of atmospheric parameters maintained inside a cargo box. The current solutions do not provide any such means to determine if items inside a cargo box are maintained in the desired environment or not.

In view of the afore-mentioned problems in the existing solutions, there is a need of an effective system and a method for determining if items placed inside a cargo box are maintained in a desired environment or not. There is a requirement to determine accurate atmospheric parameters maintained inside a cargo box. In order to solve the problems in the existing solutions, a system and a method are disclosed.

SUMMARY

Various embodiments of the invention describe a system for monitoring one or more items. The system comprises a device, a first server and a second server. The device is adapted to sense parameter(s) of one or more items placed inside a container and transmit information of the sensed parameter(s) to the first server. The first server is adapted to determine an anomaly associated with the one or more items based on the information of the sensed parameter(s) and to communicate the determined anomaly to a second server. The second server is adapted to determine an action for the anomaly and to communicate the action to the container for rectifying the anomaly.

In an embodiment of the invention, the anomaly is determined if the information of the sensed parameter(s) of the one or more items goes beyond a pre-defined threshold for the parameter(s).

In a different embodiment of the invention, the second server is adapted to determine the action for the anomaly when the anomaly is categorized under a recoverable alarm.

In an embodiment of the invention, the action communicated to the container comprises a shutdown-restart action.

In another embodiment of the invention, the second server is adapted to provide a diagnostics service to the container using a two-way communication channel.

In yet another embodiment of the invention, the one or more items and the device are placed inside one or more boxes and the one or more boxes are placed inside the container.

In another embodiment of the invention, the action received by the container is executed by the container to maintain a desired atmospheric condition inside the one or more boxes.

In still another embodiment of the invention, the container is adapted to sense the parameter(s) in the container and transmit information of the sensed parameter(s) to the second server.

In a different embodiment of the invention, the information of the sensed parameter(s) in the container and the information of the sensed parameter(s) inside the one or more boxes are different, wherein the container and the device independently sense the parameter(s).

In another embodiment of the invention, the container and the device comprise a temperature sensor, a humidity sensor, a carbon dioxide sensor and/or a pressure sensor.

In yet another embodiment of the invention, the parameter(s) sensed by the device and the container comprises temperature parameter, humidity parameter, carbon dioxide parameter and/or pressure parameter.

Various embodiments of the invention describe a method for monitoring one or more items. The method comprises steps of receiving, from a device, information of sensed parameter(s) of one or more items. Also. the one or more items placed inside a container. The method further comprises steps of determining, by a first server, an anomaly associated with the one or more items based on the information of the sensed parameter(s). The method further comprises steps of communicating the determined anomaly to a second server. Also, the second server determines an action for the anomaly and communicates the action to the container for rectifying the anomaly.

In an embodiment of the invention, the anomaly is determined if the information of the sensed parameter(s) of the one or more items goes beyond a pre-defined threshold for the parameter(s).

In a different embodiment of the invention, the second server determines the action for the anomaly when the anomaly is categorized under a recoverable alarm.

In an embodiment of the invention, the action communicated by the second server to the container comprises a shutdown-restart action.

In another embodiment of the invention, the one or more items and the device are placed inside one or more boxes and the one or more boxes are placed inside the container.

In yet another embodiment of the invention, the container senses the parameter(s) in the container and transmits information of the sensed parameter(s) to the second server In an embodiment of the invention, the second server provides a diagnostics service to the container using a two-way communication channel.

In a different embodiment of the invention, the information of the sensed parameter(s) in the container and the information of the sensed parameter(s) of the one or more items placed inside the one or more boxes are different. Also, the container and the device independently sense the parameter(s).

In another different embodiment of the invention, a computer readable medium is disclosed for monitoring one or more items. The computer readable medium comprises one or more processors and a memory is coupled to the one or more processors, the memory stores instructions executed by the one or more processors. The one or more processors are configured to receive, from a device, information of sensed parameter(s) of one or more items. Also, the one or more items are placed inside a container. The one or more processors are further configured to determine, by a first server, an anomaly associated with the one or more items based on the information of the sensed parameter(s) and communicate the determined anomaly to a second server. Also, the second server determines an action for the anomaly and communicates the action to the container for rectifying the anomaly.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Figure 1:
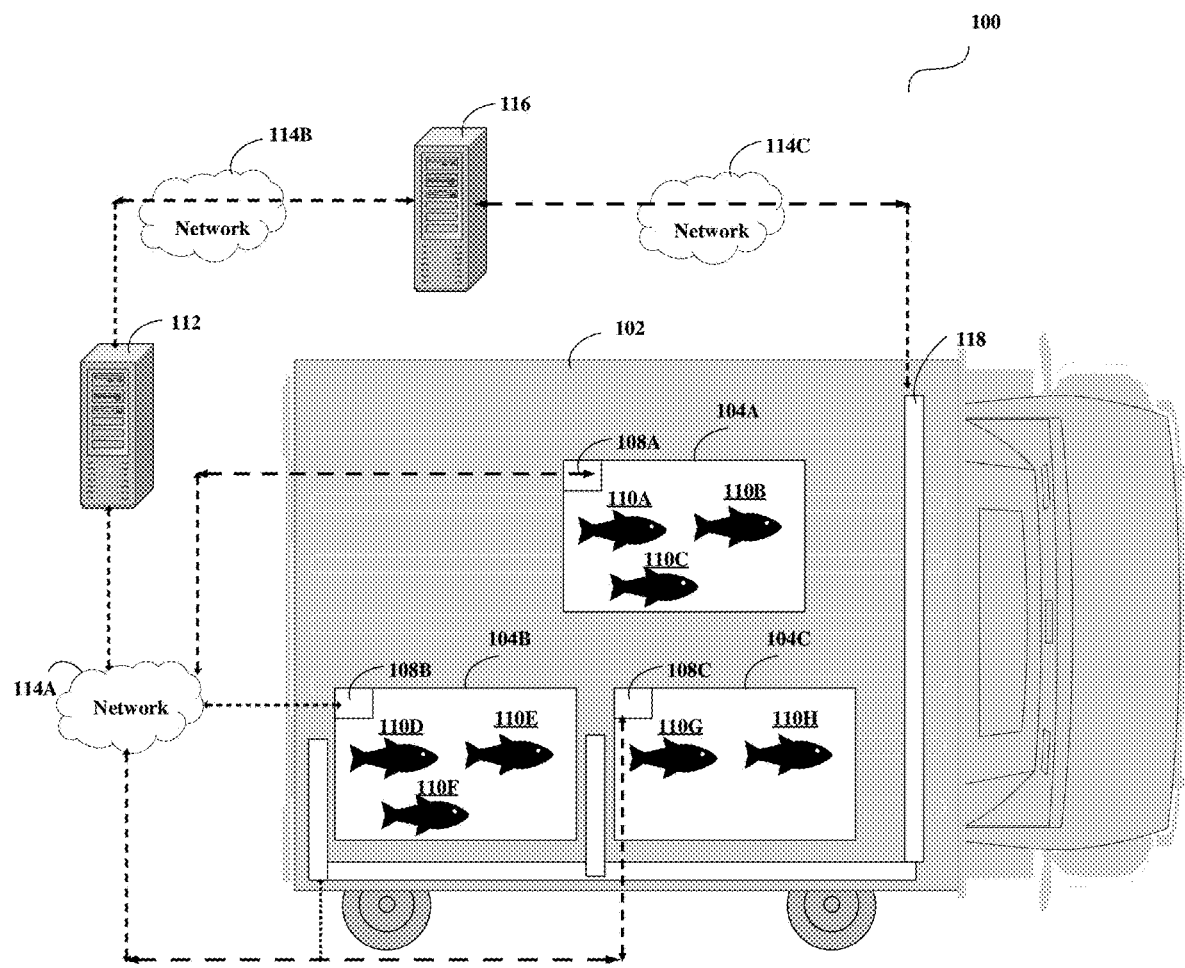
FIG. 1 depicts an exemplary system architecture according to an exemplary embodiment of the invention.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Described herein is the technology with a system and a method for monitoring items placed inside one or more boxes and taking necessary action/s to control atmospheric conditions inside the one or more boxes. One or more items may be placed inside each of one or more boxes. Further, a device may also be placed inside each of the one or more boxes. Each of the one or more boxes may be placed in a container. Each of the device inside the one or more boxes may sense parameter(s) of the one or more items inside each of the one or more boxes and may transmit information of the sensed parameter(s) to a first server. On receiving the information of the sensed parameter(s), the first server may determine an anomaly associated with the one or more items based on the information of the sensed parameter(s). Specifically, the anomaly may be determined by the first server when the information of the sensed parameter(s) goes beyond a pre-defined threshold for the sensed parameter(s).

When the first server determines the anomaly, the first server may communicate the determined anomaly to a second server. The second server may determine an action for the anomaly and may communicate the determined action to the container (for example, to a transport refrigeration unit of the container). Accordingly, the container may implement the action to rectify the anomaly.

As used herein, the one or more items may be placed inside one or more boxes. Also, the one or more items may be usable/consumable by an end customer. Alternatively, the one or more items may include content for consumption or usage by the end customer. In this case, such an item may be a bottle or a box having liquid content, solid content or semi solid content or any such item as known in the art. The content in the item or the item may be for any kind of consumption/usage and may be a pharmaceutical item/content, a liquid item/content, an eatable item/content, a lotion, a cream, tablets or any such item/content known in the art.

As used herein, the device may be positioned anywhere inside each of one or more boxes where the one or more items are placed. Also, the device may have capability to sense parameter(s) of the one or more items placed inside the one or more boxes and may also have capability to transmit information of the sensed parameter(s) to the first server through a network. Further, the device may comprise, but is not limited to, a transmitter, a receiver, sensor(s), a battery, a memory and/or processor.

As used herein, the one or more boxes may be used to hold or store the one or more items. The box may be adapted to provide a suitable/desired environment to the one or more items and may be placed in the container.

As used herein, the container may be a trailer or any vehicle that can transport the one or more items. Also, the container may comprise a transport refrigeration unit (TRU) that may be responsible for controlling operations/functions inside the container and thereby, helps in providing a suitable/desired environment to the one or more boxes placed in the container. The TRU of the container may have a capability to interact with the second server through a network.

As used herein, the first server and the second server has processing capabilities as disclosed further in the specification. The first server and the second server may be a cloud storage, a remote database, or any such storage known in the art.

As used herein, the network may refer to a wired network, a mesh network, a cellular network (such as Global System for Mobile (GSM) network, a Long-Term Evolution (LTE) network, a code-division multiple access (CDMA) network, a narrow-band internet of thing (NB-IoT) technique or category M1 technique)), a bluetooth network, a WiFi network, a ZigBee network or any such network/technique that is known in the art.

Throughout the specification, reference numeral 104 depicts different boxes. Each of the reference numerals 104A-104C may be considered as a separate box. Similarly, throughout the specification, reference numeral 108 depicts different devices. Each of the reference numerals 108A-108C may be considered as a separate device. Likewise, throughout the specification, reference numeral 110 depicts different items. Each of the reference numerals 110A-110H may be considered as a separate item.

FIG. 1 depicts an exemplary system architecture 100 according to an exemplary embodiment of the invention. As depicted in FIG. 1, a container 102 may comprise a transport refrigeration unit 118 and one or more boxes 108 may be placed inside the container 102. Also, the one or more boxes 108 may further hold or store one or more items 110. As can be seen, a first box 104A may store item 110A, 110B and 110C, a second box 104B may store item 110D, 110E and 110F, and a third box 104C may store item 110G and 110H. Further, a device 108 may be located/placed inside each of the one or more boxes 104. As an example, a first device 108A may be placed inside the first box 104A, a second device 108B may be placed inside the second box 104B, and a third device 108C may be placed inside the third box 104C.

Each of the device 108 of the one or more boxes 104 may sense parameter(s) of the one or more items 110 placed inside the one or more boxes 104 and may transmit information of the sensed parameter(s) to a first server 112 through a network 114A. Exemplary Table 1A below depicts exemplary parameter(s) (of item 110A, 110B, 110C placed inside first box 104A) sensed by the device 108A inside the first box 104A and the information of the sensed parameter(s) transmitted to the first server 112.

TABLE 1A

| Parameter sensed by Device 108A | Information Associated with Parameter(s) |
|---|---|
| Time | 2020-01-30; 11:00 AM |
| Temperature Parameter | 5° Celsius |
| Humidity Parameter | 54 Grams per cubic metre or Grams per kilogram |
| Carbon Dioxide Parameter | 252 parts per million (ppm) |
| Pressure Parameter | 102 kiloPascal (kPA) |

Similarly, the transport refrigeration unit 118 of the container 102 may also sense parameter(s) inside the container 102 where the one or more boxes 104 are placed and may transmit information of the sensed parameter(s) to a second server 116 through a network 114C. Exemplary Table 1B below depicts the parameter(s) (of first box 104A, second box 104B, third box 104C) sensed by the transport refrigeration unit 118 of the container 102 and the information of the sensed parameter(s) transmitted to the second server 116. As used herein, the parameter(s) sensed by the device 102 and the transport refrigeration unit 118 may comprise, but is not limited to, temperature parameter, humidity parameter, carbon dioxide parameter and/or pressure parameter.

TABLE 1B

| Parameter sensed by Transport Refrigeration Unit 118 of Container 102 | Information Associated with Parameter(s) |
|---|---|
| Time | 2020-01-30; 11:00 AM |
| Container Unique Identifier | 118 |
| Temperature Parameter | 8° Celsius |
| Humidity Parameter | 60 Grams per cubic metre or Grams per kilogram |
| Carbon Dioxide Parameter | 258 parts per million (ppm) |
| Pressure Parameter | 105 kiloPascal (kPA) |

Each of the device 108 and/or the transport refrigeration unit 118 of the container 102 may comprise a temperature sensor to sense temperature parameter, a humidity sensor to sense humidity parameter, a carbon dioxide sensor to sense carbon dioxide parameter, and/or a pressure sensor to sense pressure parameter inside the one or more boxes 104 and inside the container 102, respectively. The measurement of other parameters is also within the scope of the invention. In an exemplary embodiment, the transport refrigeration unit 118 of the container 102 may sense the parameter(s) and transmit the information of the sensed parameter(s) to the second server 116 and/or the device 108A may sense the parameter(s) and transmit the information of the sensed parameter(s) to the first server 112 in a periodic manner. For an instance, the transport refrigeration unit 118 and/or the device 108A may sense the parameter(s) and the transmit information of the sensed parameter(s) in every 30 minutes. In an exemplary alternative embodiment, the transport refrigeration unit 118 may sense the parameter(s) and transmit the information of the sensed parameter(s) to the second server 116 and/or the device 108A may sense the parameter(s) and transmit the information of the sensed parameter(s) to the first server 112 based on an event. For an instance, the transport refrigeration unit 118 may sense the parameter(s) and transmit the information of the sensed parameter(s) to the second server 116 when the second server 116 transmits a request to the transport refrigeration unit 118 of the container 102.

Similarly, the device 108A may sense the parameter(s) and transmit the information of the sensed parameter(s) to the first server 112 when the first server 112 transmits a request to the device 108A for providing such information. Moreover, as can be seen in the exemplary Table 1A and Table 1B above, the transport refrigeration unit 118 of the container 102 and the device 108A independently sense the parameter(s) and thereby, the information of the temperature parameter, humidity parameter, carbon dioxide parameter and/or pressure parameter and the like sensed by the transport refrigeration unit 118 of the container 102 and/or the device 108A are different as the transport refrigeration unit 118 of the container 102 senses the parameter(s) inside the container 102 and the device 108A senses the parameter(s) inside the box 104A. This embodiment of the present invention provides a technical advantage of determining accurate/effective parameters being sensed and maintained inside the box 104 as well as inside the container 102.

When the first server 112 receives the information of the sensed parameter(s) by the device 108A, the first server 112 may determine an anomaly associated with the one or more items 110A, 110B, 110C placed inside first box 104A based on the information of the parameter(s) sensed by the device 108A. For determining the anomaly, the first server 112 compares the information of each of the sensed parameter(s) with a pre-defined threshold for each of the parameter(s) to determine if the information of the sensed parameter(s) of the one or more items 110 goes beyond a pre-defined threshold for the parameter(s). Such pre-defined threshold for each of the parameter(s) may be configured by an owner of the one or more items 110, an transporter of the one or more items 110, a manufacturer of the one or more items 110 or by any such person who are related to the of the one or more items 110. Exemplary Table 2 below depicts the pre-defined threshold for each of the parameter(s).

TABLE 2

| Parameter(s) | Pre-defined threshold for parameter(s) sensed by container 118 | Pre-defined threshold for parameters) sensed by device 108 |
|---|---|---|
| Temperature Parameter | 15° Celsius | 10° Celsius |
| Humidity Parameter | 30 Grams per cubic metre or Grams per kilogram | 30 Grams per cubic metre or Grams per kilogram |
| Carbon Dioxide Parameter | 240 parts per million (PPm) | 240 parts per million (PPm) |
| Pressure Parameter | 90 kiloPascal (kPA) | 90 kiloPascal (kPA) |

Considering an exemplary first scenario, Table 1A and Table 2 above, the first server 112 may compare the information of each of sensed temperature parameter(s) with a pre-defined threshold for the temperature parameter(s). By comparing, the first server 112 may determine an anomaly associated with the items 110A, 110B, 110C placed inside the first box 104A as the information (i.e. 5° Celsius) of sensed temperature parameter(s) by the device 108A is below the pre-defined threshold for the temperature parameter(s) (i.e. 10° Celsius). Consider an exemplary second scenario where information of sensed temperature parameter(s) by the device 108A is 30° Celsius. In such a scenario, the first server 112 may again determine an anomaly associated with the items 110A, 110B, 110C placed inside the first box 104A as the information (i.e. 30° Celsius) of sensed temperature parameter(s) by the device 108A is above the pre-defined threshold for the temperature parameter(s) (i.e. 10° Celsius). In the same manner, the first server 112 may compare information of other sensed parameter(s) with a pre-defined threshold for that particular parameter(s) and may determine an anomaly. Furthermore, when the first server 112 does not determine any anomaly (i.e. when the information of each of sensed parameter(s) is not beyond the pre-defined threshold for that parameter(s)), then the first server 112 may not perform any further action. This embodiment of the present invention also provides a technical advantage of determining if the items 110 placed inside the box 104 and/or inside the container 102 are maintained in a desired environment or not (i.e. within the pre-defined threshold).

When the first server 112 determines the anomaly, the first server 112 may communicate the determined anomaly to the second server 116 through a network 114B. The second server 116 may analyze the anomaly communicated by the first server 112 and may determine an action for the anomaly. Also, the second server 116 may determine an action for the anomaly when the anomaly is categorized under a recoverable alarm. Then, the second server 116 may communicate the determined action for the anomaly to the transport refrigeration unit 118 of the container 102 through a network 114C for rectifying the anomaly. On receiving the action, the transport refrigeration unit 118 of the container 102 may execute the action to maintain a desired atmospheric condition inside the one or more boxes 104. Accordingly, the transport refrigeration unit 118 of the container 102 may implement the action to rectify the anomaly. Such an action may comprise, but is not limited to, a shutdown-restart action, an auto-calibration action, a temperature change action, a gas release action, a stop gas release action or any such action that is obvious to a person skilled in the art.

As used herein, the shutdown-restart action may refer to an action implemented by the transport refrigeration unit 118 of the container 102 to automatically shut-down and restart the transport refrigeration unit 118 of the container 102, the device 108 and/or the one or more boxes 104. As used herein, the calibration action may refer to an action implemented by the transport refrigeration unit 118 of the container 102 to automatically perform calibration of the transport refrigeration unit 118 of the container 102. As used herein, the temperature change action may refer to an action implemented by the transport refrigeration unit 118 of the container 102 to automatically increase or decrease the temperature inside the one or more boxes 104 so that a desired atmospheric condition may be maintained inside the one or more boxes 104. As used herein, the gas release action may refer to an action implemented by the transport refrigeration unit 118 of the container 102 to automatically release more gas for maintaining desired parameters inside the container 102 and/or the one or more boxes 104. As used herein, the stop gas release action may refer to an action implemented by the transport refrigeration unit 118 of the container 102 to automatically stop releasing of gas inside the container 102 and/or the one or more boxes 104. By implementing the action, the anomaly determined may be resolved. This embodiment of the present invention provides a technical advantage of providing appropriate solutions to the problems inside the container 102 and/or inside the one or more boxes 104.

Considering the exemplary first scenario explained above, the second server 116 may determine an action to increase temperature inside the first box 104A by 5° Celsius to maintain the temperature inside the first box 104A at the pre-defined threshold (i.e. 10° Celsius) since the temperature parameter(s) sensed by the device 108A inside the first box 104A is 10° Celsius. Considering the exemplary second scenario explained above, the second server 116 may determine an action to decrease temperature inside the first box 104A by 20° Celsius to maintain the temperature inside the first box 104A at the pre-defined threshold (i.e. 10° Celsius) since the temperature parameter(s) sensed by the device 108A inside the first box 104A is 30° Celsius. Then, the second server 116 may transmit temperature increase/decrease (i.e. change) action to the transport refrigeration unit 118 of the container 102 and the transport refrigeration unit may accordingly, increase/decrease temperature inside the boxes 104.

Moreover, by determining an appropriate action for rectifying the anomaly, the second server 116 may provide a diagnostics service to the transport refrigeration unit 118 of the container 102 using two-way communication channel. The capability of the transport refrigeration unit 118 of using two-way communication channel enables the transport refrigeration unit 118 of the container 102 to transmit the information of the sensed parameter inside the container 102 at regular intervals (as described in Table 1B above) as well as to receive any action from the second server 116.

Although the invention has been described where the first server 112 determines an anomaly and the second server 116 determines an action for the anomaly; it is understood for a person skilled in the art that a single server can also determine an anomaly and also determine an action for the anomaly. In other words, the first server 112 and the second server 116 may represent a single server for determining anomaly and the action instead of two different servers.

Figure 2:
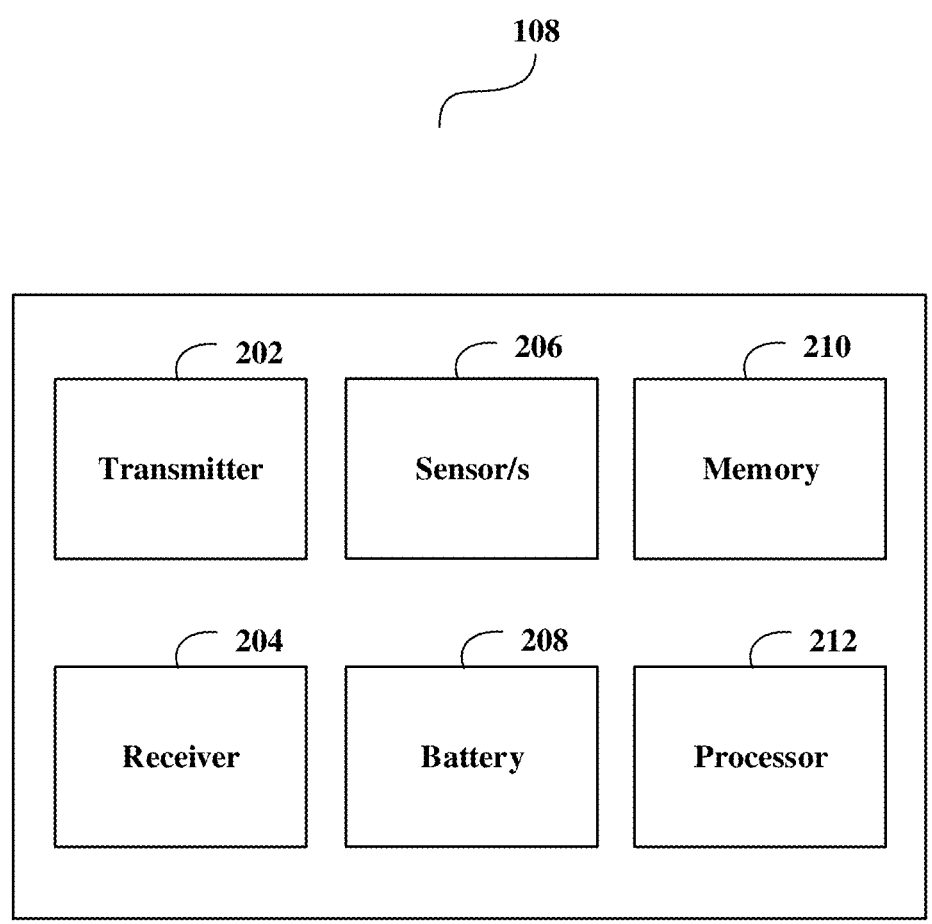
FIG. 2 depicts block diagram of different components of an exemplary device according to an exemplary embodiment of the invention.

FIG. 2 depicts a block diagram of different components of an exemplary device 108 placed inside a box 104 according to an exemplary embodiment of the invention. The device 108 may comprise of, but is not limited to, a communication unit 202, sensor(s) 204, a battery 206, a memory 208 and/or a processor 210. The sensor(s) 204 may comprise a temperature sensor adapted to sense temperature parameter, a humidity sensor adapted to sense humidity parameter, a carbon dioxide sensor adapted to sense carbon dioxide parameter, and/or a pressure sensor adapted to sense pressure parameter inside the one or more boxes 104. The sensor(s) 204 may communicate the sensed parameter(s) to the processor 210 and the processor 210 may be adapted to determine information of the sensed parameter(s). The processor 210 may communicate the information of the sensed parameter(s) to the communication unit 202. The communication unit 202 may be adapted to transmit the information of the sensed parameter(s) to a first server 112 through a network 114A. The communication unit 202 may also be adapted to receive a request from the first server 112 to provide the information of the sensed parameter(s). The battery 206 may be adapted to provide power to the device 108. In an exemplary embodiment, the communication unit 202 may be a transceiver. The memory 208 may be adapted to store the information of the sensed parameter(s).

Moreover, the communication unit 202, the sensor(s) 204, the battery 206, and/or the memory 208 may be communicably coupled with the processor 210. The different units described herein are exemplary. The invention may be performed using one or more units. For example, the tasks executed by the communication unit 202, the sensor(s) 204, the battery 204, the memory 208 and/or the processor 210 may be performed by a single unit. Alternatively, a greater number of units as described herein may be used to perform the present invention.

Figure 3:
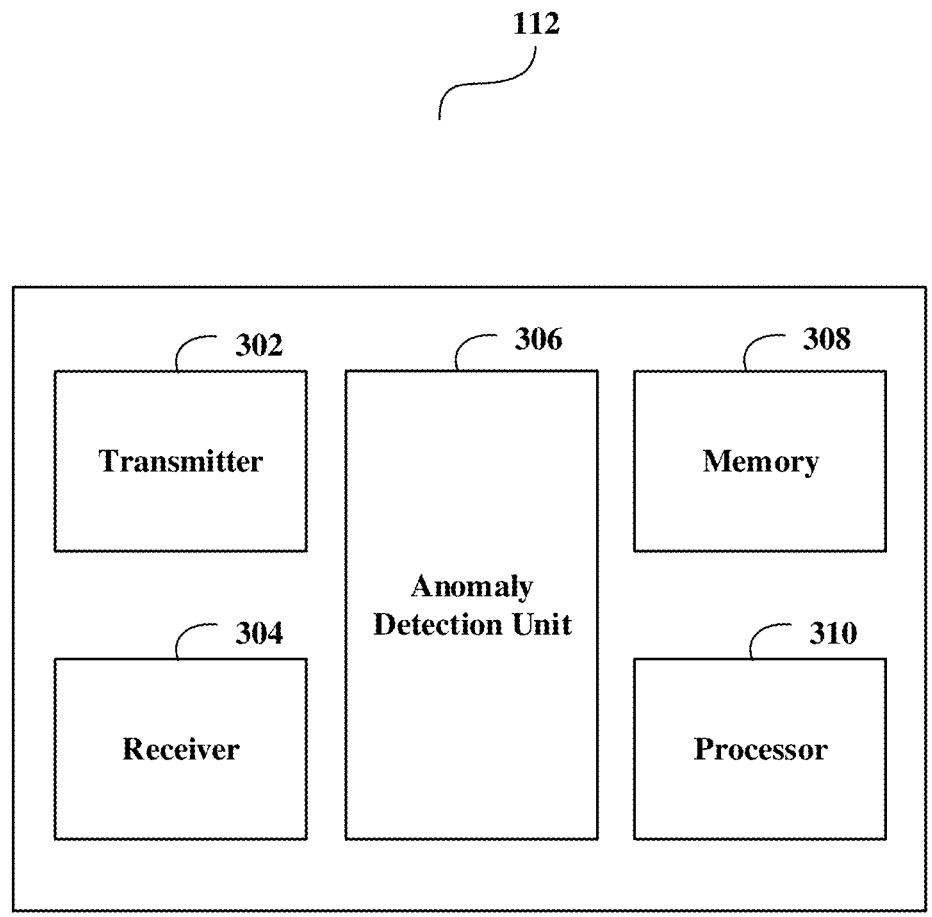
FIG. 3 depicts block diagram of different components of an exemplary first server according to an exemplary embodiment of the invention.

FIG. 3 depicts a block diagram of different components of an exemplary first server 112 according to an exemplary embodiment of the invention. The first server 112 may comprise of, but is not limited to, a communication unit 302, an anomaly detection unit 304, a memory 306 and/or a processor 308. The communication unit 302 may be adapted to receive information of the sensed parameter(s) from one or more devices 104 or through a network 114A. In an exemplary embodiment, the communication unit 302 may be a transceiver. The communication unit 302 may communicate the information of the sensed parameter(s) to the anomaly detection unit 304. The anomaly detection unit 304 may be adapted to determine an anomaly based on the information of the sensed parameter(s) as described above and may communicate the determined anomaly to the communication unit 302. The communication unit 302 may be adapted to transmit the determined anomaly to a second server 116 through a network 114B. The memory 306 may be adapted to store the determined anomaly.

Moreover, the communication unit 302, the anomaly detection unit 304, and/or the memory 306 may be communicably coupled with the processor 308. The different units described herein are exemplary. The invention may be performed using one or more units. For example, the tasks executed by the communication unit 302, the anomaly detection unit 304, and/or the memory 306 and/or the processor 308 may be performed by a single unit. Alternatively, a greater number of units as described herein may be used to perform the present invention.

Figure 4:
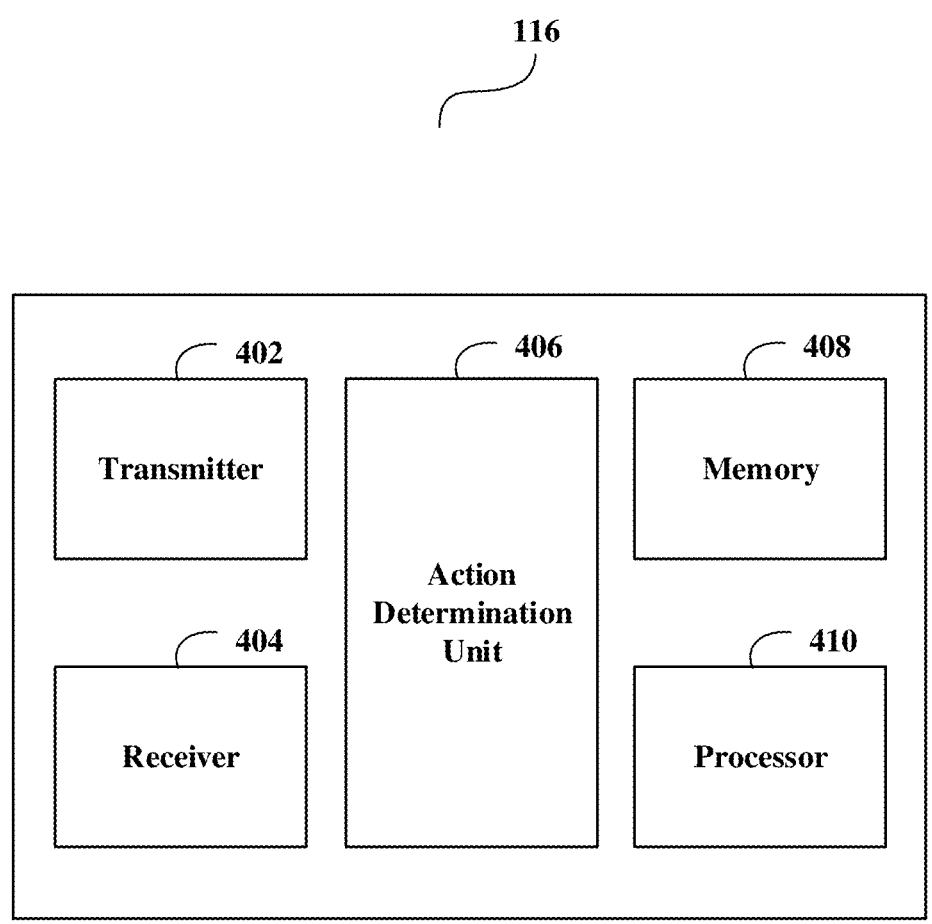
FIG. 4 depicts block diagram of different components of an exemplary second server according to an exemplary embodiment of the invention.

FIG. 4 depicts a block diagram of different components of an exemplary second server 116 according to an exemplary embodiment of the invention. The second server 116 may comprise of, but is not limited to, a communication unit 402, an action determination unit 404, a memory 406 and/or a processor 408. The communication unit 402 may be adapted to receive information of the sensed parameter(s) from a transport refrigeration unit 118 of a container 102 through a network 114C. The communication unit 402 may also be adapted to receive determined anomaly from a first server through a network 114B. In an exemplary embodiment, the communication unit 402 may be a transceiver. The communication unit 402 may communicate the determined anomaly to the action determination unit 404. The action determination unit 404 may be adapted to determine an action for the determined anomaly as explained in FIG. 1 and may communicate the action to the communication unit 402. The communication unit 402 may be adapted to transmit the action to the transport refrigeration unit 118 of a container 102 through a network 114C. The memory 306 may be adapted to store the determined action.

Moreover, the communication unit 402, the action determination unit 404, and/or the memory 406 may be communicably coupled with the processor 408. The different units described herein are exemplary. The invention may be performed using one or more units. For example, the tasks executed by the communication unit 402, the action determination unit 404, and/or the memory 406 and/or the processor 408 may be performed by a single unit. Alternatively, a greater number of units as described herein may be used to perform the present invention.

Figure 5:
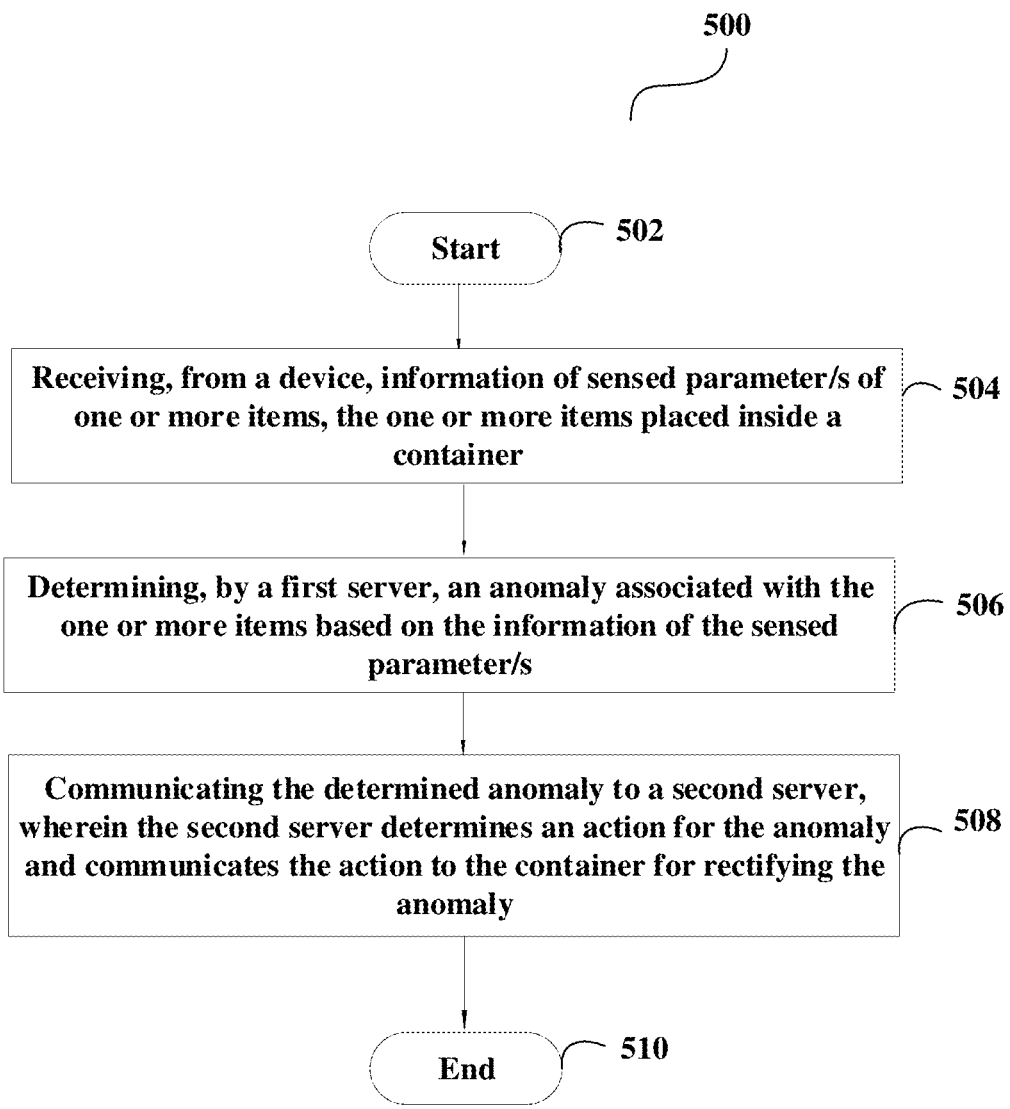
FIG. 5 depicts an exemplary flowchart illustrating a method to perform the invention according to an exemplary embodiment of the invention.

FIG. 5 depicts a flowchart outlining the features of the invention in an exemplary embodiment of the invention. The method flowchart 500 describes a method being for monitoring one or more items 110 placed inside one or more boxes 104. The method flowchart 500 starts at step 502.

At step 504, a first server 112 may receive, from device 108, information of sensed parameter(s) of one or more items 110 through a network 114A. The one or more items 110 placed inside one or more boxes 104 and the one or more boxes 104 may be placed inside a container 102. This has been explained above in greater details in FIG. 1.

At step 506, the first server 112 may determine an anomaly associated with the one or more items 110 based on the information of the sensed parameter(s). This has been explained above in greater details in FIG. 1.

At step 508, the first server 112 may communicate the determined anomaly to a second server 116 through a network 114B. The second server 116 may determine an action for the anomaly and communicates the action to the container 102 (i.e. to a transport refrigeration unit 118 of the container 102) for rectifying the anomaly. This has been explained above in greater details in FIG. 1. Then, the method flowchart 500 may end at 510.

The present invention is applicable to pharmaceutical industry, cosmetics industry, food industry and any such industry producing environmentally sensitive items/content and is well known in the art. The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a first server 112. A computer readable medium comprises one or more processors and a memory coupled to the one or more processors, the memory stores instructions executed by the one or more processors. The one or more processors configured to receive, from a device 108, information of sensed parameter(s) of one or more items 110, the one or more items 110 placed inside a container 102. The one or more processors configured to determine, by a first server 112, an anomaly associated with the one or more items 110 based on the information of the sensed parameter(s). The one or more processors further configured to communicate the determined anomaly to a second server 116. The second server 116 may determines an action for the anomaly and communicates the action to the container 102 for rectifying the anomaly.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a device adapted to sense a parameter of an item placed inside a container and transmit information of the sensed parameter of the item to a first server;
   the container configured to sense a parameter of the container and transmit information of the sensed parameter of the container to a second server;
   wherein the information of the sensed parameter of the item is different than the information of the sensed parameter of the container;
   the first server adapted to determine an anomaly associated with the item based on the information of the sensed parameter of the item and to communicate the determined anomaly to the second server; and
   the second server adapted to determine an action for the anomaly and to communicate the action to the container for rectifying the anomaly;
   the second server configured to control the container based on information of the sensed parameter of the container.

2. The system of claim 1, wherein the anomaly is determined if the information of the sensed parameter of the item goes beyond a pre-defined threshold for the parameter sensed parameter of the item.

3. The system of claim 1, wherein the second server is adapted to determine the action for the anomaly when the anomaly is categorized under a recoverable alarm.

4. The system of claim 1, wherein the action communicated to the container comprises a shutdown-restart action.

5. The system of claim 1, wherein the second server is adapted to provide a diagnostics service to the container using a two-way communication channel.

6. The system of claim 1, wherein the item and the device are placed inside a box and the box are placed inside the container.

7. The system of claim 6, wherein the action received by the container is executed by the container to maintain a desired atmospheric condition inside the box.

8. The system of claim 1, wherein the container and the device independently sense the information of the sensed parameter of the container and the information of the sensed parameter of the item.

9. The system of claim 1, wherein the container and the device comprise a temperature sensor, a humidity sensor, a carbon dioxide sensor and/or a pressure sensor.

10. The system of claim 1, wherein the parameter sensed by the device and the container comprises temperature parameter, humidity parameter, carbon dioxide parameter and/or pressure parameter.

11. A method comprising:
    receiving at a first server, from a device, information of sensed parameter of an item, the item placed inside a container;
    receiving at a second server, from the container, information of sensed parameter of the container;
    wherein the information of the sensed parameter of the item is different than the information of the sensed parameter of the container
    determining, by the first server, an anomaly associated with the item based on the information of the sensed parameter of the item; and
    communicating the determined anomaly to the second server, wherein the second server determines an action for the anomaly and communicates the action to the container for rectifying the anomaly;
    wherein the second server controls the container based on information of the sensed parameter of the container.

12. The method of claim 11, wherein the anomaly is determined if the information of the sensed parameter of the item goes beyond a pre-defined threshold for the parameter.

13. The method of claim 12, wherein the second server determines the action for the anomaly when the anomaly is categorized under a recoverable alarm.

14. The method of claim 12, wherein the action communicated by the second server to the container comprises a shutdown-restart action.

15. The method of claim 12, wherein the item and the device are placed inside a box and the box is placed inside the container.

16. The method of claim 11, wherein the second server provides a diagnostics service to the container using a two-way communication channel.

17. The method of claim 16, wherein the wherein the container and the device independently sense the information of the sensed parameter of the container and the information of the sensed parameter of the item.

18. A computer readable medium comprising a non-transitory memory storing instructions executed by one or more processors, the one or more processors configured to implement the method of claim 11.

* * * * *